US011239959B2

(12) United States Patent
Pinayour Chandrasekaran et al.

(10) Patent No.: US 11,239,959 B2
(45) Date of Patent: Feb. 1, 2022

(54) METHODS AND APPARATUS FOR CODE BLOCK LEVEL FEEDBACK

(71) Applicant: QUALCOMM Incorporated, San Diego, CA (US)

(72) Inventors: Sarath Pinayour Chandrasekaran, Hyderabad (IN); Loksiva Paruchuri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/805,524

(22) Filed: Feb. 28, 2020

(65) Prior Publication Data

US 2020/0304251 A1  Sep. 24, 2020

(30) Foreign Application Priority Data

Mar. 19, 2019  (IN) .............................. 201941010666

(51) Int. Cl.
*H04L 1/18* (2006.01)

(52) U.S. Cl.
CPC .......... *H04L 1/1893* (2013.01); *H04L 1/1809* (2013.01); *H04L 1/1816* (2013.01)

(58) Field of Classification Search
CPC ... H04L 1/0058; H04L 1/1812; H04L 5/0055; H04L 5/0094; H04L 1/1864; H04L 1/0048; H04L 1/0043; H04L 1/0045; H04L 1/1829; H04L 1/1854; H04L 1/1835; H04L 5/001; H04L 1/1845; H04L 5/0007; H04L 5/0023; H04L 5/1819; H04L 5/00; H04L 5/0061; H04L 1/1614; H04L 1/0061; H04W 52/0206; H04W 76/27; Y02D 30/70
See application file for complete search history.

(56) References Cited

U.S. PATENT DOCUMENTS

| 2018/0278368 A1* | 9/2018 | Kim ...................... H04L 1/0058 |
| 2019/0158230 A1* | 5/2019 | Chen .................... H04L 1/0057 |
| 2019/0207734 A1* | 7/2019 | Yang .................... H04L 1/1819 |
| 2019/0363843 A1* | 11/2019 | Gordaychik .......... H04L 5/0058 |
| 2020/0008216 A1* | 1/2020 | Iyer ....................... H04W 72/04 |
| 2020/0084789 A1* | 3/2020 | Wang .................... H04L 1/1812 |
| 2020/0252168 A1* | 8/2020 | Kim ...................... H04L 1/1664 |

FOREIGN PATENT DOCUMENTS

| WO | 2018172538 A1 | 9/2018 |
| WO | 2018185638 A1 | 10/2018 |

OTHER PUBLICATIONS

International Search Report and Written Opinion—PCT/US2020/023249—ISAEPO—dated Jun. 30, 2020.

* cited by examiner

*Primary Examiner* — Jung Liu
(74) *Attorney, Agent, or Firm* — Patterson + Sheridan, L.L.P.

(57) ABSTRACT

Methods, systems, and devices for wireless communications are described. A user equipment (UE) may receive a transmission comprising an indication of at least one failed code block group in a plurality of code block groups, wherein a code block group comprises a plurality of code blocks, re-assign code blocks to different code block groups (CBGs) according to a total number of code blocks (CBs) across the at least one failed code block group (CBG) and a maximum number of code block groups (CBGs) per a transport block (TB), and configure a retransmission based on the re-assigned code blocks (CBs).

24 Claims, 20 Drawing Sheets

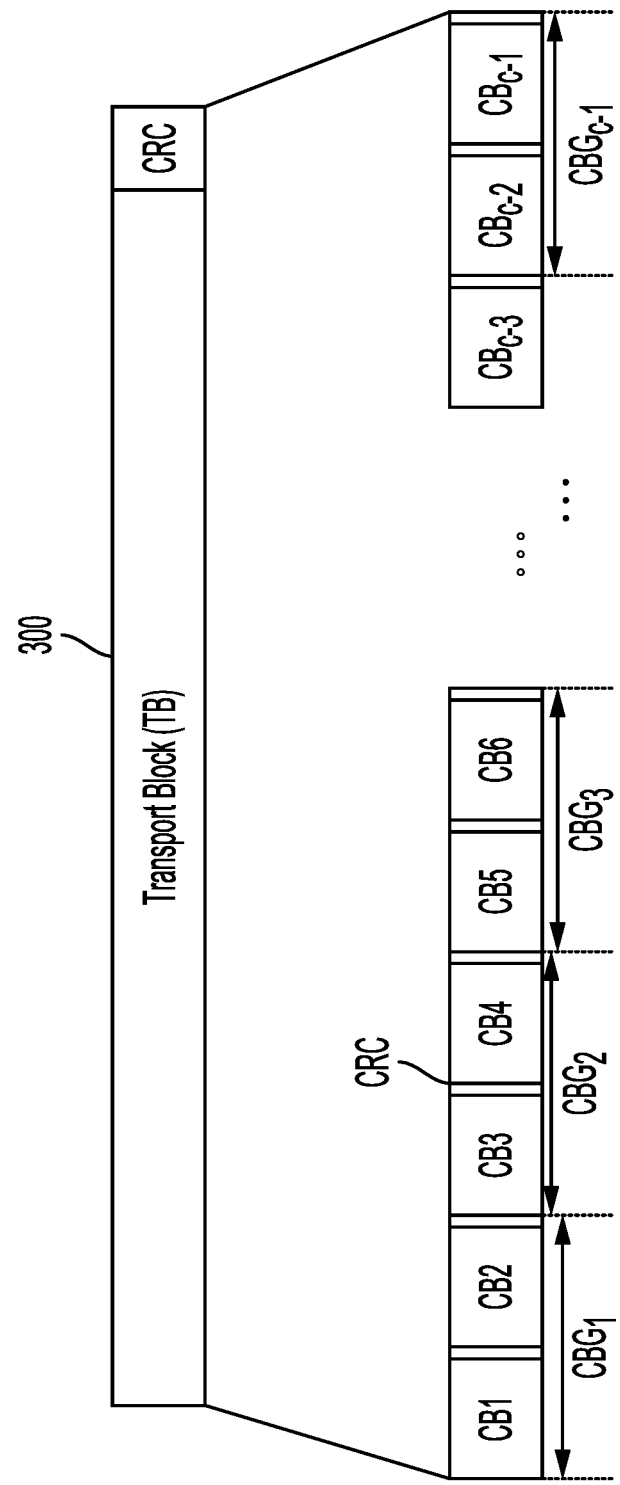

| Code Blocks | CBG | PUCCH HARQ feedback initial transmission | CBGTI Retransmission#1 | PUCCH HARQ feedback Retransmission#1 | CBGTI Retransmission#2 | PUCCH HARQ feedback Retransmission#2 |
|---|---|---|---|---|---|---|
| CB-0 | CBG-0 | NACK | 1 | NACK | 1 | ACK |
| CB-1 | | | | | | |
| CB-2 | | | | | | |
| CB-3 | | | | | | |
| CB-4 | | | | | | |
| CB-5 | CBG-1 | NACK | 1 | ACK | 0 | ACK |
| CB-6 | | | | | | |
| CB-7 | | | | | | |
| CB-8 | | | | | | |
| CB-9 | | | | | | |
| CB-10 | CBG-2 | NACK | 1 | ACK | 0 | ACK |
| CB-11 | | | | | | |
| CB-12 | | | | | | |
| CB-13 | | | | | | |
| CB-14 | | | | | | |
| CB-15 | CBG-3 | ACK | 0 | ACK | 0 | ACK |
| CB-16 | | | | | | |
| CB-17 | | | | | | |
| CB-18 | | | | | | |
| CB-19 | | | | | | |
| CB-20 | CBG-4 | ACK | 0 | ACK | 0 | ACK |
| CB-21 | | | | | | |
| CB-22 | | | | | | |
| CB-23 | | | | | | |
| CB-24 | CBG-5 | ACK | 0 | ACK | 0 | ACK |
| CB-25 | | | | | | |
| CB-26 | | | | | | |
| CB-27 | | | | | | |
| CB-28 | CBG-6 | ACK | 0 | ACK | 0 | ACK |
| CB-29 | | | | | | |
| CB-30 | | | | | | |
| CB-31 | | | | | | |
| CB-32 | CBG-7 | ACK | 0 | ACK | 0 | ACK |
| CB-33 | | | | | | |
| CB-34 | | | | | | |
| CB-35 | | | | | | |

FIG. 4

| Code blocks | Regrouped CBG | CBGTI (Re-transmission#1) | PUCCH HARQ feedback re-transmission#1 |
|---|---|---|---|
| CB-0 | CBG-0 | 1 | NACK |
| CB-1 | | | |
| CB-2 | CBG-1 | 1 | ACK |
| CB-3 | | | |
| CB-4 | CBG-2 | 1 | ACK |
| CB-5 | | | |
| CB-6 | CBG-3 | 1 | ACK |
| CB-7 | | | |
| CB-8 | CBG-4 | 1 | ACK |
| CB-9 | | | |
| CB-10 | CBG-5 | 1 | ACK |
| CB-11 | | | |
| CB-12 | CBG-6 | 1 | ACK |
| CB-13 | | | |
| CB-14 | CBG-7 | 1 | ACK |

FIG. 5A

| Code blocks | Regrouped CBG | CBGTI (Re-transmission#1) | PUCCH HARQ feedback re-transmission#1 |
|---|---|---|---|
| CB-0 | CBG-0 | 1 | ACK |
| CB-1 | CBG-1 | 1 | ACK |
| CB-2 | CBG-2 | 0 | Need not be sent |
| CB-3 | | | |
| CB-4 | | | |
| CB-5 | CBG-3 | 0 | Need not be sent |
| CB-6 | | | |
| CB-7 | CBG-4 | 0 | Need not be sent |
| CB-8 | | | |
| CB-9 | CBG-5 | 0 | Need not be sent |
| CB-10 | | | |
| CB-11 | CBG-6 | 0 | Need not be sent |
| CB-12 | | | |
| CB-13 | CBG-7 | 0 | Need not be sent |
| CB-14 | | | |

FIG. 5B

| Code Blocks | CBG | PUCCH HARQ feedback 1st transmission | Code Blocks | Regrouped CBG | PUCCH HARQ feedback additional 1st transmission | CBGTI (Retransmission#1) | PUCCH HARQ feedback for re-transmission#1 |
|---|---|---|---|---|---|---|---|
| CB-0 | CBG-0 | NACK | CB-0 | CBG-0 | NACK | 1 | ACK |
| CB-1 | | | CB-1 | | | | |
| CB-2 | | | CB-2 | CBG-1 | ACK | 0 | Need not be sent |
| CB-3 | | | CB-3 | | | | |
| CB-4 | | | CB-4 | CBG-2 | NACK | 1 | ACK |
| CB-5 | CBG-1 | NACK | CB-5 | | | | |
| CB-6 | | | CB-6 | CBG-3 | ACK | 0 | Need not be sent |
| CB-7 | | | CB-7 | | | | |
| CB-8 | | | CB-8 | CBG-4 | ACK | 0 | Need not be sent |
| CB-9 | | | CB-9 | | | | |
| CB-10 | CBG-2 | NACK | CB-10 | CBG-5 | NACK | 1 | ACK |
| CB-11 | | | CB-11 | | | | |
| CB-12 | | | CB-12 | CBG-6 | ACK | 0 | Need not be sent |
| CB-13 | | | CB-13 | | | | |
| CB-14 | | | CB-14 | CBG-7 | ACK | 0 | Need not be sent |
| CB-15 | CBG-3 | ACK | | | | | |
| CB-16 | | | | | | | |
| CB-17 | | | | | | | |
| CB-18 | | | | | | | |
| CB-19 | | | | | | | |
| CB-20 | CBG-4 | ACK | | | | | |
| CB-21 | | | | | | | |
| CB-22 | | | | | | | |
| CB-23 | | | | | | | |
| CB-24 | CBG-5 | ACK | | | | | |
| CB-25 | | | | | | | |
| CB-26 | | | | | | | |
| CB-27 | | | | | | | |
| CB-28 | CBG-6 | ACK | | | | | |
| CB-29 | | | | | | | |
| CB-30 | | | | | | | |
| CB-31 | | | | | | | |
| CB-32 | CBG-7 | ACK | | | | | |
| CB-33 | | | | | | | |
| CB-34 | | | | | | | |
| CB-35 | | | | | | | |

FIG. 6

| Transmission# | CBGs | Code Blocks Transmitted on PDSCH | Number of bits transmitted on PDSCH | PUCCH HARQ Feedback | PUCCH HARQ Feedback_Additional |
|---|---|---|---|---|---|
| 1 | 8 | 36 | 319784 | 8bits | NA |
| 2 | 8 | 15 | 133244 | 8bits | NA |
| 3 | 8 | 5 | 44415 | 8bits | NA |
| 4 | 8 | 5 | 44415 | 8bits | NA |

705

| Transmission# | CBGs | Code Blocks Transmitted on PDSCH | Number of bits transmitted on PDSCH | PUCCH HARQ Feedback | PUCCH HARQ Feedback_Additional |
|---|---|---|---|---|---|
| 1 | 8 | 36 | 319784 | 8bits | NA |
| 2 | 8 | 15 | 133244 | 8bits | NA |
| 3 | 8 | 2 | 17766 | 2bits | NA |
| 4 | 8 | 1 | 8882 | 1bits | NA |

710

| Transmission# | CBGs | Code Blocks Transmitted on PDSCH | Number of bits transmitted on PDSCH | PUCCH HARQ Feedback | PUCCH HARQ Feedback_Additional |
|---|---|---|---|---|---|
| 1 | 8 | 36 | 319784 | 8bits | 8 bits |
| 2 | 8 | 6 | 53292 | 6bits | Not required as one to one mapping is already achieved between CB and CBG |
| 3 | 8 | 1 | 8882 | 1bit | Not required as one to one mapping is already achieved between CB and CBG |
| 4 | 8 | 1 | 8882 | 1bit | Not required as one to one mapping is already achieved between CB and CBG |

| Code Blocks | CBG | CBGTI (Retransmission#1) | Code Blocks | Regrouped CBG | CBGTI_additional (Retransmission#1) |
|---|---|---|---|---|---|
| CB-0 | CBG-0 | 1 | CB-0 | CBG-0 | 1 |
| CB-1 | | | CB-1 | CBG-1 | 0 |
| CB-2 | | | CB-2 | | |
| CB-3 | | | CB-3 | CBG-2 | 1 |
| CB-4 | | | CB-4 | | |
| CB-5 | CBG-1 | 1 | CB-5 | CBG-3 | 0 |
| CB-6 | | | CB-6 | | |
| CB-7 | | | CB-7 | CBG-4 | 0 |
| CB-8 | | | CB-8 | | |
| CB-9 | | | CB-9 | CBG-5 | 1 |
| CB-10 | CBG-2 | 1 | CB-10 | | |
| CB-11 | | | CB-11 | CBG-6 | 0 |
| CB-12 | | | CB-12 | | |
| CB-13 | | | CB-13 | CBG-7 | 0 |
| CB-14 | | | CB-14 | | |
| CB-15 | CBG-3 | 0 | | | |
| CB-16 | | | | | |
| CB-17 | | | | | |
| CB-18 | | | | | |
| CB-19 | | | | | |
| CB-20 | CBG-4 | 0 | | | |
| CB-21 | | | | | |
| CB-22 | | | | | |
| CB-23 | | | | | |
| CB-24 | CBG-5 | 0 | | | |
| CB-25 | | | | | |
| CB-26 | | | | | |
| CB-27 | | | | | |
| CB-28 | CBG-6 | 0 | | | |
| CB-29 | | | | | |
| CB-30 | | | | | |
| CB-31 | | | | | |
| CB-32 | CBG-7 | 0 | | | |
| CB-33 | | | | | |
| CB-34 | | | | | |
| CB-35 | | | | | |

| Transmission# | CBGs | Code Blocks Transmitted on PDSCH | Number of bits transmitted on PDSCH | CBGTI | CBGTI_Additional |
|---|---|---|---|---|---|
| 1 | 8 | 36 | 319784 | 8bits | NA |
| 2 | 8 | 15 | 133244 | 8bits | NA |
| 3 | 8 | 5 | 44415 | 8bits | NA |
| 4 | 8 | 5 | 44415 | 8bits | NA |

910

| Transmission# | CBGs | Code Blocks Transmitted on PDSCH | Number of bits transmitted on PDSCH | CBGTI | CBGTI_Additional |
|---|---|---|---|---|---|
| 1 | 8 | 36 | 319784 | 8bits | 8 bits |
| 2 | 8 | 6 | 53292 | 6bits | Not required as one to one mapping is already achieved between CB and CBG |
| 3 | 8 | 1 | 8882 | 8bits | Not required as one to one mapping is already achieved between CB and CBG |
| 4 | 8 | 1 | 8882 | 8bits | Not required as one to one mapping is already achieved between CB and CBG |

FIG. 9

METHODS AND APPARATUS FOR CODE BLOCK LEVEL FEEDBACK

CROSS REFERENCES

The present application for patent claims priority to Indian Patent Application No. 201941010666, entitled "METHODS AND APPARATUS FOR CODE BLOCK REGROUPING," filed Mar. 19, 2019, all of which is expressly incorporated by reference herein.

BACKGROUND

The following relates generally to wireless communications, and more specifically to techniques for code block re-grouping during retransmissions in wireless communication systems.

Wireless communications systems are widely deployed to provide various types of communication content such as voice, video, packet data, messaging, broadcast, and so on. These systems may be capable of supporting communication with multiple users by sharing available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may transmit downlink control information (DCI) to a user equipment (UE) to schedule an uplink or downlink transmission. The DCI may grant resources for transmission of a transport block. A transport block may be broken into several code blocks which may be further grouped into code block groups. In 5G NR, transmissions on a physical uplink shared channel (PUSCH) and physical downlink shared channel (PDSCH) may be code block group based. Techniques for regrouping code blocks for retransmissions may be improved.

BRIEF SUMMARY

Techniques described below relate to improved methods, systems, devices, or apparatuses that support code block regrouping in a wireless communication system. Generally, described techniques provide a method for receiving at a UE, a transmission comprising an indication of at least one failed code block group in a plurality of code block groups, wherein a code block group comprises a plurality of code blocks, re-assigning code blocks to different code block groups according to a total number of code blocks across the at least one failed code block group and a maximum number of code blocks groups per a transport block and configuring a retransmission based on the re-assigned code blocks.

In some cases, a base station may receive a transmission comprising an indication of a failed decoding for at least one code block group of a plurality of code block groups, wherein a code block group comprises a plurality of code blocks, re-assign code blocks to different code block groups according to a total number of code blocks across the failed code block groups and a maximum number of code block groups per a transport block, and configure a retransmission based on the re-assigned code blocks.

An apparatus for wireless communication is described. The apparatus may include means for receiving at a UE, a transmission comprising an indication of at least one failed code block group in a plurality of code block groups, wherein a code block group comprises a plurality of code blocks, means for re-assigning code blocks to different code block groups according to a total number of code blocks across the at least one failed code block group and a maximum number of code blocks groups per a transport block and means for configuring a retransmission based on the re-assigned code blocks.

Another apparatus for wireless communication is described. The apparatus may include means at a base station for receiving a transmission comprising an indication of a failed decoding for at least one code block group of a plurality of code block groups, wherein a code block group comprises a plurality of code blocks, means for re-assigning code blocks to different code block groups according to a total number of code blocks across the failed code block groups and a maximum number of code block groups per a transport block, and means for configuring a retransmission based on the re-assigned code blocks.

Another apparatus for wireless communication is described. The apparatus may include a processor, memory in electronic communication with the processor, and instructions stored in the memory. The instructions may be operable to cause the processor to receive at a UE, a transmission comprising an indication of at least one failed code block group in a plurality of code block groups, wherein a code block group comprises a plurality of code blocks, re-assign code blocks to different code block groups according to a total number of code blocks across the at least one failed code block group and a maximum number of code blocks groups per a transport block and configure a retransmission based on the re-assigned code blocks.

In some cases, the instructions may be operable to cause a processor to receive a transmission comprising an indication of a failed decoding for at least one code block group of a plurality of code block groups, wherein a code block group comprises a plurality of code blocks, re-assign code blocks to different code block groups according to a total number of code blocks across the failed code block groups and a maximum number of code block groups per a transport block, and configure a retransmission based on the re-assigned code blocks.

A non-transitory computer-readable medium for wireless communication is described. The non-transitory computer-readable medium may include instructions operable to cause a processor to receive at a UE, a transmission comprising an indication of at least one failed code block group in a plurality of code block groups, wherein a code block group comprises a plurality of code blocks, re-assign code blocks to different code block groups according to a total number of code blocks across the at least one failed code block group and a maximum number of code blocks groups per a transport block and configure a retransmission based on the re-assigned code blocks While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 3 illustrates an example of a transport block that supports regrouping of code blocks during retransmissions in accordance with aspects of the present disclosure.

FIG. 4 illustrates an example that supports regrouping of code blocks during retransmissions in accordance with aspects of the present disclosure.

FIGS. 5A and 5B illustrate an example that supports regrouping of code blocks during retransmissions in accordance with aspects of the present disclosure.

FIG. 6 illustrates an example that supports regrouping of code blocks during retransmissions in accordance with aspects of the present disclosure.

FIG. 7 is a resource utilization example that supports regrouping of code blocks during retransmissions in accordance with aspects of the present disclosure.

FIG. 8 illustrates an example that supports regrouping of code blocks during retransmissions in accordance with aspects of the present disclosure.

FIG. 9 is a resource utilization example that supports regrouping of code blocks during retransmissions in accordance with aspects of the present disclosure.

DETAILED DESCRIPTION

A transport block may be broken into several code blocks which may be further grouped into code block groups. In 5G NR, transmissions on a physical uplink shared channel (PUSCH) and physical downlink shared channel (PDSCH) may be code block group based. If decoding fails for one or a few code blocks, a user equipment or gNB may need to transmit or receive an entire code block group. Regrouping code blocks during retransmissions provides for more efficient feedback on failed code block decoding, and thus more effective use of physical layer resources and also provides for reduced power consumption.

Therefore, a base station and UE as described herein may implement techniques for regrouping of code blocks during retransmissions.

Aspects of the disclosure are initially described in the context of a wireless communications system. Aspects of the disclosure are further illustrated by and described with reference to apparatus diagrams, system diagrams, and flowcharts that relate to regrouping of code blocks during retransmissions.

Figure 1:
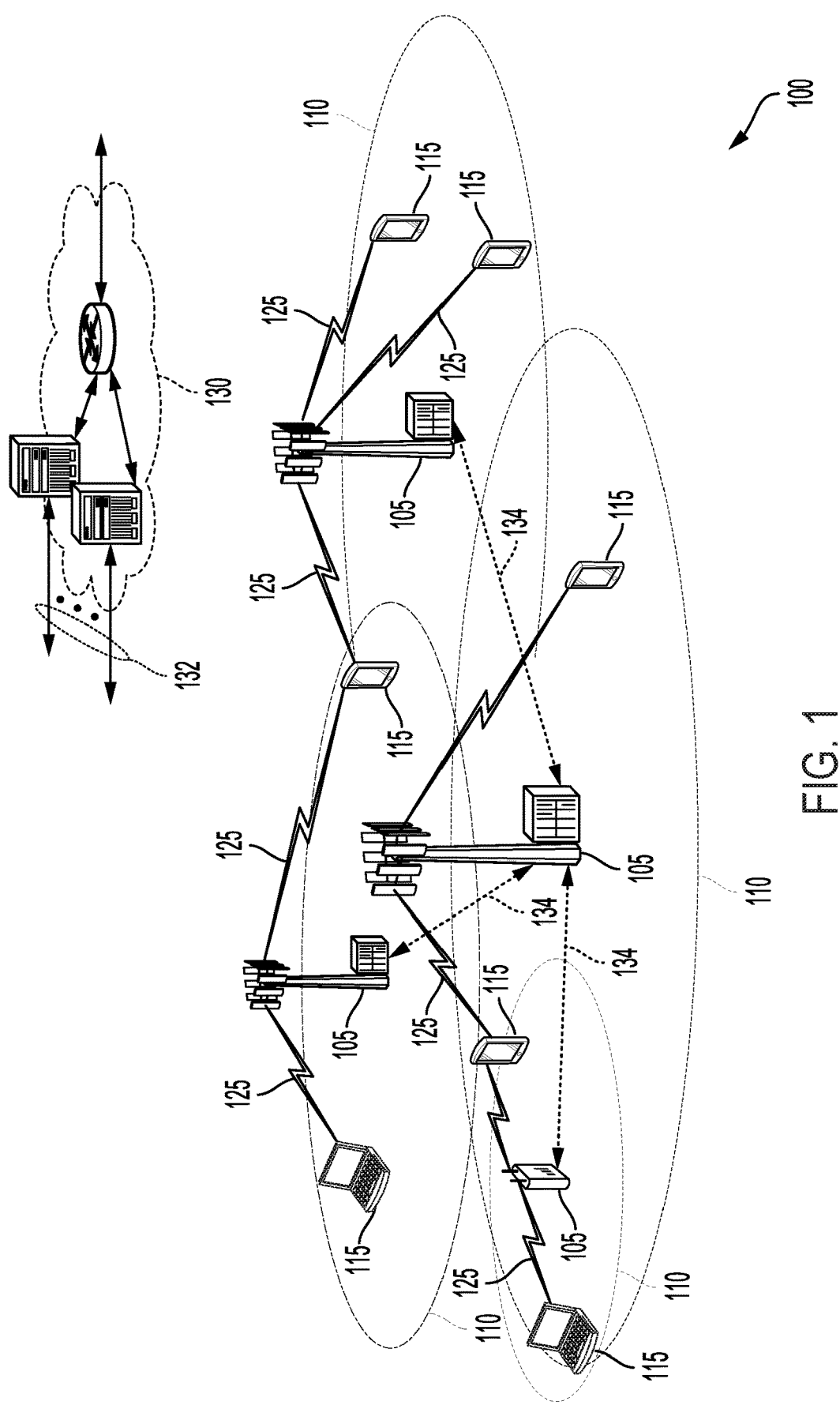
FIG. 1 illustrates an example of a system for wireless communications that supports regrouping of code blocks during retransmissions in accordance with aspects of the present disclosure.

FIG. 1 illustrates an example of a wireless communications system 100 that supports regrouping of code blocks during retransmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Figure 1A:
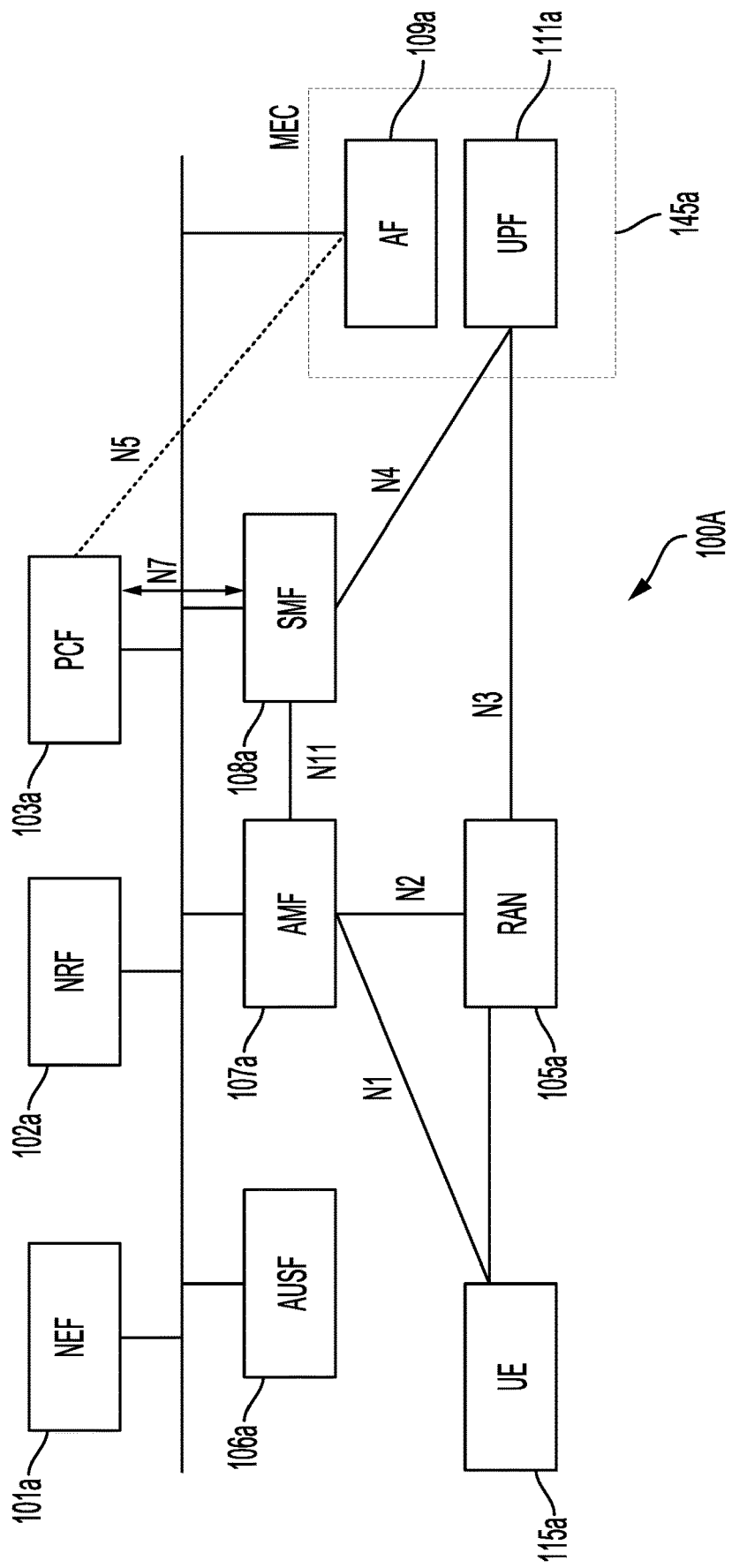
FIG. 1A illustrates an example of exemplary 5G/NR architecture.

FIG. 1A illustrates an example of 5G/NR architecture. The 5G service-based architecture (as specified in 3GPP TS 23.501) contains several control plane functional entities including a Policy Control Function (PCF) 103*a*, Session Management Function (SMF) 108*a*, Application Function (AF) 109*a*, Access and Mobility Management Function (AMF) 107*a*, Authentication Server Function (AUSF) 106*a*, etc. User Plane Function (UPF) 111*a* is a data plane functional entity. The user plane carries user traffic and the control plane carries signaling in the network. A UE 115*a* is connected to a RAN as well as AMF 107*a*. The Network Exposure Function (NEF) may be used as the entry point in the 5G network for authorized third parties. Using NEF, users may configure how appropriate application traffic in the user plane is directed towards MEC applications. NEF may also be used for exposing network information such as radio resource element, mobility, etc, to the MEC system. In other words, the NEF may handle control plane functions for third party service providers to manage MEC operations.

In the example of FIG. 1A, UE 115*a* connects to AMF 107*a* which provides UE-based authentication, authorization, mobility management, registration management, UE mobility event notification, security context management etc. The 3GPP interface between AMF 107*a* and UE 115*a* is referred to as N1. SMF 108*a* is responsible for session management and allocates IP addresses to UEs 115*a*. SMF 108*a* also controls and selects the UPF for data transfer. The 3GPP interface between AMF and SMF is referred to as N11 and the 3GPP interface between RAN 105*a* and AMF 107*a* is referred to as N2. Exemplary AF 109*a* may provide information on packet flow to PCF 503. PCF 103*a* is responsible for policy control and determines policies about mobility and session management. The 3GPP interface between the SMF 108*a* and PCF 103*a* is referred to as N7, and the 3GPP interface between the AF and PCF is referred to as N5. AUSF 106*a* stores data for authentication of UE 115*a*.

Wireless communications system 100/100A may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100/100A may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100/100A may also operate in an extremely high frequency (EHF) region of the spectrum (e.g., from 30 GHz to 300 GHz), also known as the millimeter band. In some examples, wireless communications system 100/100A may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100/100A may utilize both licensed and unlicensed radio frequency spectrum bands. For example, wireless communications system 100/100A may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100/100A may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100/ 100A may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100/100A, and may be referred to as a transmission time interval (TTI). In other cases, a smallest scheduling unit of the wireless communications system 100/100A may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100/100A. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100/100A (e.g., base stations 105 or UEs 115) may have a hardware configuration that supports communications over a particular carrier bandwidth, or may be configurable to support communications over one of a set of carrier bandwidths. In some examples, the wireless communications system 100/100A may include base stations 105 and/or UEs 115 that support simultaneous communications via carriers associated with more than one different carrier bandwidth.

Wireless communications system 100/100A may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100/100A may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100/100A may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and a base station 105 described herein may implement techniques for regrouping code blocks during retransmissions in a wireless communication system.

Figure 2:
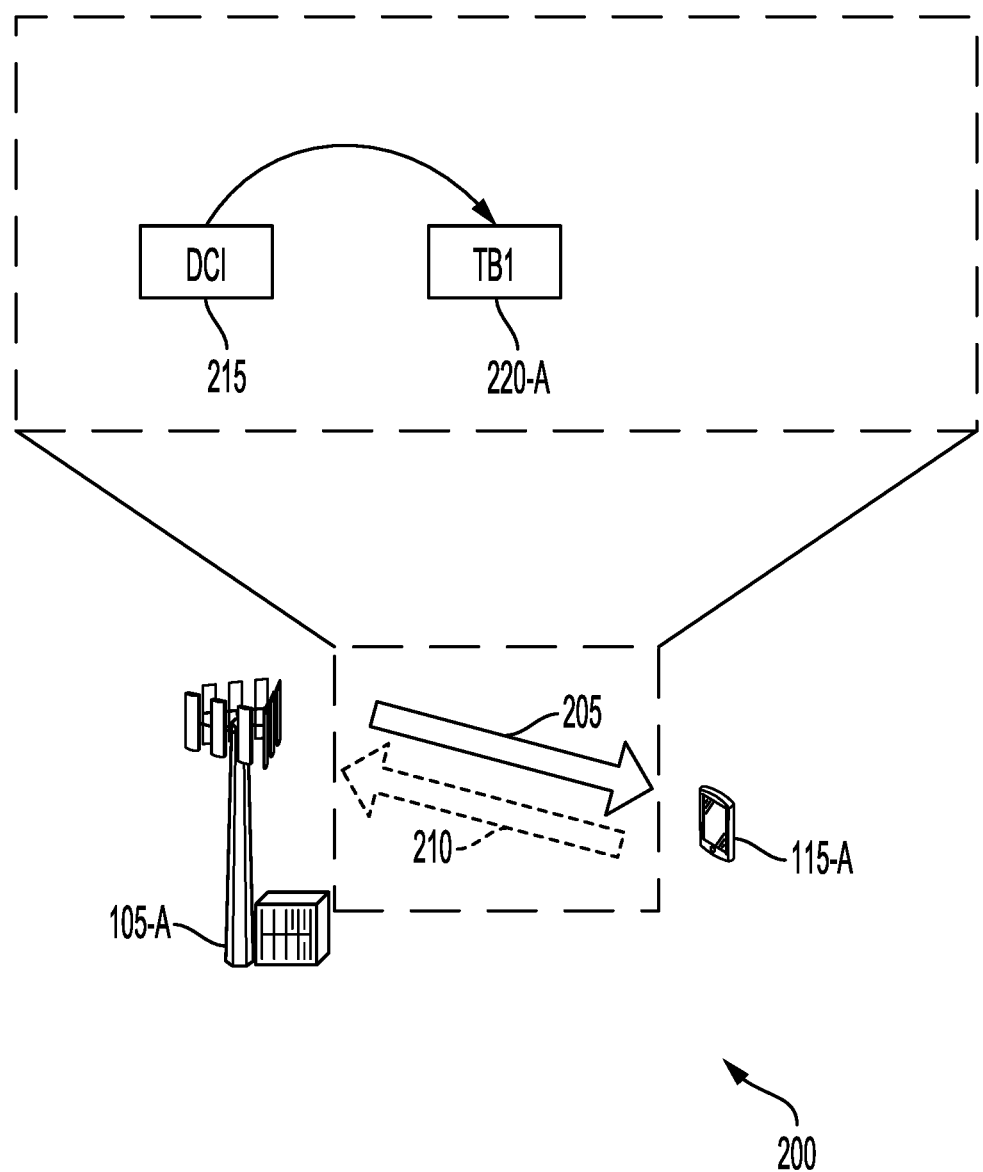
FIG. 2 illustrates an example of a wireless communications system that supports regrouping of code blocks during retransmissions in accordance with aspects of the present disclosure.

FIG. 2 illustrates an example of a wireless communications system 200 that supports regrouping of code blocks during retransmissions in accordance with aspects of the present disclosure. In some examples, wireless communications system 200 may implement aspects of wireless communication system 100/100A. Wireless communications system 200 may include UE 115-a and base station 105-a, which may be respective examples of a UE 115 and a base station 105.

Base station 105-a and UE 115-a may communicate using a downlink link 205 and an uplink link 210. Base station 105-a may transmit DCI 215 to UE 115-a on downlink 205 to schedule transmissions. For example, DCI 215 may schedule resources for base station 105-a to transmit a transport block 220a-a on downlink 205 to UE 115-a for downlink communications. Or, the DCI may schedule UE 115-a to transmit a transport block 220 on uplink 210 to base station 105-a for uplink communications. In some cases, the transport block 220 may carry uplink or downlink data and be transmitted on an uplink data channel (e.g., a physical uplink shared channel (PUSCH)) or a downlink data channel (e.g., a physical downlink shared channel (PDSCH)) scheduled by the DCI.

A transport block may be transmitted with a target block error rate. Block error rate may refer to the ratio of the number of erroneous blocks received to the total number or blocks sent. An erroneous block may refer to transport block for which a cyclic redundancy check (CRC) is wrong. A target block error rate may be a specific value e.g. 10%. If the target block error rate for a transmission is exceeded, an entire transport block is retransmitted. In some communication systems, e.g. 5G NR systems, larger transport blocks are utilized, and retransmission of these larger transport blocks may lead to inefficiencies. Thus, in some examples, a transport block is split into smaller sized code blocks (CBs) which are combined to form code block groups (CBGs). CBG based transmissions provide for enhanced efficiency and improved latency in a communication system by allowing a UE to decode CBGs and send HARQ feedback on a CBG level.

FIG. 3 illustrates an example of a transport block that supports regrouping of code blocks during retransmissions in accordance with aspects of the present disclosure. As shown, transport block 300 is split into code blocks, $CB_1$, $CB_2$ $CB_3$, ... $CB_{c-1}$. In turn, several CBs may be combined to form a CBG. Here, $CB_1$ and $CB_2$ are combined to form a first code block group, $CBG_1$; $CB_3$ and $CB_4$ are combined to form a second code block group, $CBG_2$; $CB_5$ and $CB_6$ are combined to form a third code block group, $CBG_3$, etc. In other examples, different combinations of CBs may be combined to form each CBG.

In exemplary systems (e.g. 5G NR), ACK/NACK for delivery of each CBG data unit is provided. In other words, CRC is checked at a CBG level. Thus, CBG1 and CBG2 may be transmitted, pass CRC and be ACK'd while CBG3 may fail CRC and be NACK'd. this would necessitate retransmission of failed CBG3 only.

FIG. 4 illustrates an example table that supports regrouping of code blocks during retransmissions in accordance with aspects of the present disclosure. As shown in the table, an exemplary transport block is split into 36 code blocks shown as $CB_0$ through $CB_{35}$. Code blocks are combined to form code block groups shown as CBG-0 through CBG-7. As illustrated, CBG-0 comprises $CB_0$ through $CB_4$; CBG-1 comprises $CB_5$ through $CB_9$; CBG-2 comprises $CB_{10}$ through $CB_{14}$; etc. For an initial transmission of the transport block, all CBGs are transmitted. In this example, assume decoding fails for $CB_0$, $CB_5$, and $CB_{10}$. A UE acknowledging transmissions on a CBG level sends PUCCH HARQ feedback as a NACK corresponding to each of CBG-0, CBG-1 and CBG-2; and an ACK corresponding to each of CBG-3, CBG-4, CBG-5, CBG-6 and CBG-7. Here, the size of the PUCCH HARQ feedback is 8 bits and a 10% BLER is assumed. In one aspect of disclosed examples, for a given HARQ process, for any number of retransmissions, CBG and PUCCH HARQ feedback size is assumed not to change.

A CBG transmission indicator (CBGTI) denotes whether retransmission of a CBG is required. CBGTI is a field present in DCI that schedules PDSCH/PUSCH transmissions. By reading this field, a transmitter discovers CBGs to be re-transmitted. The CBGTI may be a binary value of 1 to signify a retransmission is required of a failed CBG. A CBGTI value of 0 signifies retransmission is not required (e.g. where a CBG transmission is successful). In the example of FIG. 4, CBGTI for a first retransmisison of the transport block is equal to 1 for failed CBG-0, CBG-1 and CBG-2, and equal to 0 for each of the remaining CBGs. For a second retransmission, CBGTI is equal to 1 for failed CBG-0 only. Retransmission of failed CBGs may continue until all PUCCH HARQ are ACK'd. In an aspect of disclosed examples, CBGTI corresponds to DCI. CBGTI and CBG is disclosed in 3GPP 38.212, 38.214.

In another aspect of disclosed examples, several parameters for a transport block are specified. For instance, in the example of FIG. 4, the transport block size is specified as 319784 bits, maximum number of code words scheduled by DCI is 1, LDPC base graph is 1, the number of code blocks is 36, and the maximum number of CBGs per transport block is 8. Low Density Parity check (LDPC) refers to a channel coding technique used in 5G NR for data channels (PUSCH/PDSCH.) Two base graphs have been defined namely BG1 and BG2. One of these base graphs may be chosen based on TB size and code rate as defined in 3GPP 38.212 section 6.2.2 LDPC base graph selection.

In examples, beginning from a first retransmission, code blocks may be re-assigned or regrouped to different code block groups. In particular, failed code blocks may be re-grouped to different code block groups. For instance, in the example of FIG. 4, assume decoding failed during an initial transmission for CB0, CB5 and CB10 belonging to CBG-0, CBG-1 and CBG-2, respectively. As illustrated in FIG. 5A, the number of code blocks across NACK'd CBGs (C) may be set to 15 and a maximum code block group per transport block value (N) may be set to 8. Failed $CB_0$ may remain assigned to CBG-0, failed $CB_5$ may be re-assigned to CBG-2 and failed $CB_{10}$ may be re-assigned to CBG-5. Thus, regrouped CBG-0 comprises $CB_0$ and $CB_1$; regrouped CBG-1 comprises $CB_2$ and $CB_3$; regrouped CBG-3 comprises $CB_6$ and CB7; regrouped CBG-4 comprises CB8 and $CB_9$; regrouped CBG-5 comprises $CB_{10}$ and $CB_{11}$; regrouped CBG-6 comprises CB12 and $CB_{13}$; and regrouped CBG-7 comprises $CB_{14}$. In this example, CBGTI for a first retransmission of the transport block is set to 1 for CBG-0 through CBG-7. In this example, 15 CBs are retransmitted on a first retransmission. Continuing with this example, assuming decoding fails for $CB_0$ upon the first retransmision, then CBG-0 is NACK'd and CBG-0 through CBG-7 are ACK'd.

As illustrated in FIG. 5B, for a second retransmission of the CBGs, the number of code blocks across NACK'd CBGs (C) may be set to 2 and a maximum code block group per transport block value (N) may be set to 8. $CB_0$ and $CB_1$ may be re-assigned to CBG-0 and CBG-1, respectively. In this example, CBGTI for a second retransmission is set to 1 for CBG-0 and CBG-1, and is set to 0 for CBG-2 through CBG-7. Upon the second retransmission, PUCCH HARQ feedback is sent on CBG-0 and CBG-1. Here, both are ACK'd to indicate successful decoding of $CB_0$ and $CB_1$. In examples, PUCCH HARQ feedback need not be sent for CBG2 through CBG-7 as they are not being retransmitted.

In an aspect, the size of CBGTI (DCI) may not change. In the example of FIG. 5B, although only two CBGs (CBG-0 and CBG-1) require retransmission, DCI size is not reduced to 2 bits but rather remains at 8 bits. Therefore, the remaining code blocks are regrouped into remaining CBG-2 through CBG-7 as illustrated. In aspects, CBG-2 through CBG-7 are not re-acknowledged (ACK'd) on PUCCH HARQ feedback since they are not being retransmitted. This may be left for gNB interpretation.

In examples, the size of CBGTI may correspond to the number of CBGs to be retransmitted where DCI size is decoded dynamically.

FIG. 6 illustrates another example that supports regrouping of code blocks during retransmissions in accordance with aspects of the present disclosure. As shown in the table, an exemplary transport block is split into 36 code blocks shown as $CB_0$ through $CB_{35}$. For a first transmission, code blocks are combined to form code block groups shown as CBG-0 through CBG-7. As illustrated, CBG-0 comprises $CB_0$ through $CB_4$; CBG-1 comprises $CB_5$ through $CB_9$; CBG-2 comprises $CB_{10}$ through $CB_{14}$; etc. For the first transmission of the transport block, all CBGs are transmitted. As illustrated, decoding fails for $CB_0$, $CB_5$, and $CB_{10}$. A UE acknowledging transmissions on a CBG level sends PUCCH HARQ feedback as a NACK corresponding to each of CBG-0, CBG-1 and CBG-2; and an ACK corresponding to each of CBG-3, CBG-4, CBG-5, CBG-6 and CBG-7. In this example, the size of the PUCCH HARQ feedback is 8 bits and a 10% BLER is assumed. In an aspect of disclosed examples, for a given HARQ process, for any number of retransmissions, CBG and PUCCH HARQ feedback size is assumed not to change.

In the exemplary embodiment of FIG. 6, the number of code blocks across NACK'd CBGs (C) is set to 15 and a maximum code block group per transport block value (N) is set to 8. Code blocks are regrouped so that CBG-0 now comprises $CB_0$ and $CB_1$; CBG-1 now comprises $CB_2$ and $CB_3$, CBG-2 now comprises $CB_4$ and $CB_5$, CBG-3 now comprises $CB_6$ and CB7; CBG-4 now comprises CB8 and $CB_9$; CBG-5 now comprises $CB_{10}$ and $CB_{11}$; CBG-6 now comprises CB12 and $CB_{13}$, and CBG-7 now comprises $CB_{14}$.

In examples, additional HARQ feedback may be generated for regrouped CBGs. This is done by marking a NACK against CBGs that carry at least one CB for which decoding failed. Thus, CBG-0, CBG-2 and CBG-5 may be designated with a NACK. Upon a first retransmission, CBGTI (DCI) is set to 1 for CBG-0, CBG-2 and CBG-5 only. A UE may successfully decode all CBGs and send PUCCH HARQ feedback as an ACK corresponding to CBG-0, CBG-1 and CBG-5. In examples, PUCCH HARQ feedback need not be sent for CBG1, CBG-3, CBG-4, CBG-6, and CBG-7 as they are not being retransmitted.

In this example, providing additional HARQ feedback allows for retransmission of 6 CBs only, ie, the number of CBs to be decoded is reduced. This provides power savings, greater granularity on a CB level and an optimization of PDSCH resource use.

In some examples, additional HARQ feedback need not be provided if after regrouping, a one to one mapping is already achieved between CB and CBG.

FIG. 7 is a resource utilization example that supports regrouping of code blocks during retransmissions in accordance with aspects of the present disclosure. In FIG. 7, table 705 illustrates transport block retransmissions without re-grouping code blocks. Here, a transport block is split into 36 code blocks, corresponding to 319784 bits transmitted on PDSCH. The size of PUCCH HARQ feedback on each CBG is 8 bits. Assuming 3 CBs fail on an initial transmission, 15 CBs may be retransmitted on a first retransmission, corresponding to 133244 bits transmitted on PDSCH. Assuming only one CBG fails decoding on a second retransmission, 5 CBs may be retransmitted corresponding to 44415 bits, etc.

In contrast to table 705, tables 710 and 715 of FIG. 7 transport block retransmissions with code blocks regrouped. In table 710, a transport block is split into 36 code blocks, corresponding to 1, 319784 bits transmitted on PDSCH. The size of PUCCH HARQ feedback on each CBG is 8 bits. Assuming 3 CBs fail on an initial transmission, the number of code blocks across NACK'd CBGs (C) may be set to 15 and a maximum code block group per transport block value (N) may be set to 8. 15 CBs may be retransmitted on a first retransmission, corresponding to 133244 bits transmitted on PDSCH. Assuming only one CBG fails decoding on a second retransmission, 2 CBs may be retransmitted on a second retransmission corresponding to 17766 bits (as opposed to 44415 bits) transmitted on PDSCH. PUCCH HARQ feedback is 2 bits only (as opposed to 8 bits).

In table 715, a transport block is split into 36 code blocks, corresponding to 319784 bits transmitted on PDSCH. The size of PUCCH HARQ feedback on each CBG is 8 bits. Assuming 3 CBs fail on an initial transmission, the number of code blocks across NACK'd CBGs (C) may be set to 15 and a maximum code block group per transport block value (N) may be set to 8. Additional feedback provided for regrouped CBGs allows for transmission of just 6CBs on a first PDSCH retransmission (as opposed to 15 CBs). This corresponds to 53292 bits transmitted on PDSCH (as opposed to 133244). Six bits are required for PUCCH HARQ feedback. As illustrated in table 715, assuming only one CBG fails decoding on a second retransmission, only 1 CB may be retransmitted, corresponding to 8882 bits (as opposed to 44415 bits in table 705). In this example, PUCCH HARQ feedback is only 1 bit.

In accordance with disclosed examples, re-grouping code blocks provides for optimal use of PDSCH and PUCCH resources. In some examples, exact CB to be retransmitted may be conveyed. In other words, there may be a 1-1 mapping between CB and CB. The CB resolution in a CBG may improve with increasing retransmissions due to regrouping. For instance, CBG-0 consists of CB-0, CBG-1 consists of CB-1, etc.

FIG. 8 illustrates an example that supports regrouping of code blocks for PUSCH transmissions in accordance with aspects of the present disclosure. In FIG. 8, assume decoding fails for a gNB for $CB_0$, $CB_5$ and $CB_{10}$. Thus, gNB may schedule a first retransmission for the entire CBG-0, CBG-1 and CBG-2 using existing CBGTI fields. As illustrated in the example of FIG. 8, code blocks may be re-grouped across CBG-0, CBG-1 and CBG-2. Additional CBGTI information is generated for a first retransmission, by setting a value of 1 against each CBG for which at least one CB fails decoding. Upon decoding DCI, a UE has knowledge of failed CBGs and may regroup CBs to CBGs. A UE may perform a first re-transmission for CBGs (e.g. containing only 6 CBs instead of 15). Subsequent retransmissions achieve greater levels of granularity for CBs.

FIG. 9 is a resource utilization example that supports regrouping of code blocks during retransmissions in accordance with aspects of the present disclosure. In FIG. 9, table 905 illustrates transport block retransmissions without re-grouping code blocks. Here, a transport block is split into 36 code blocks, corresponding to 319784 bits transmitted on PUSCH. The size of CBGTI feedback on each CBG is 8 bits. Assuming 3 CBs fail on an initial transmission, 15 CBs may be retransmitted on a first retransmission, corresponding to 133244 bits transmitted on PUSCH. Assuming only one CBG fails decoding on a second retransmission, 5 CBs may be retransmitted corresponding to 44415 bits, etc.

In table 910, a transport block is split into 36 code blocks, corresponding to 319784 bits transmitted on PUSCH. The size of CBGTI feedback on each CBG is 8 bits. Assuming 3 CBs fail on an initial transmission, the number of code blocks across NACK'd CBGs (C) may be set to 15 and a maximum code block group per transport block value (N) may be set to 8. Additional feedback is provided for regrouped CBGs. Thus, a UE reading DCI knows CBGs that failed and may regroup the CBs into CBGs a UE may thus perform retransmission for CBGs corresponding to 6 CBs (as opposed to 15 CBs). This corresponds to 53292 bits transmitted on PUSCH (as opposed to 133244). As illustrated in table 910, assuming only one CBG fails decoding on a second retransmission, only 1 CB may be retransmitted on PUCCH, corresponding to 8882 bits (as opposed to 44415 bits).

In aspects, the size of a CBG may be specified in an RRC message. In disclosed examples, a field is included in RRC to enable or disable regrouping. In examples, for PUSCH scheduling, (DCI 0_1), a field such as additional-CBGTI may be included.

Figure 10:
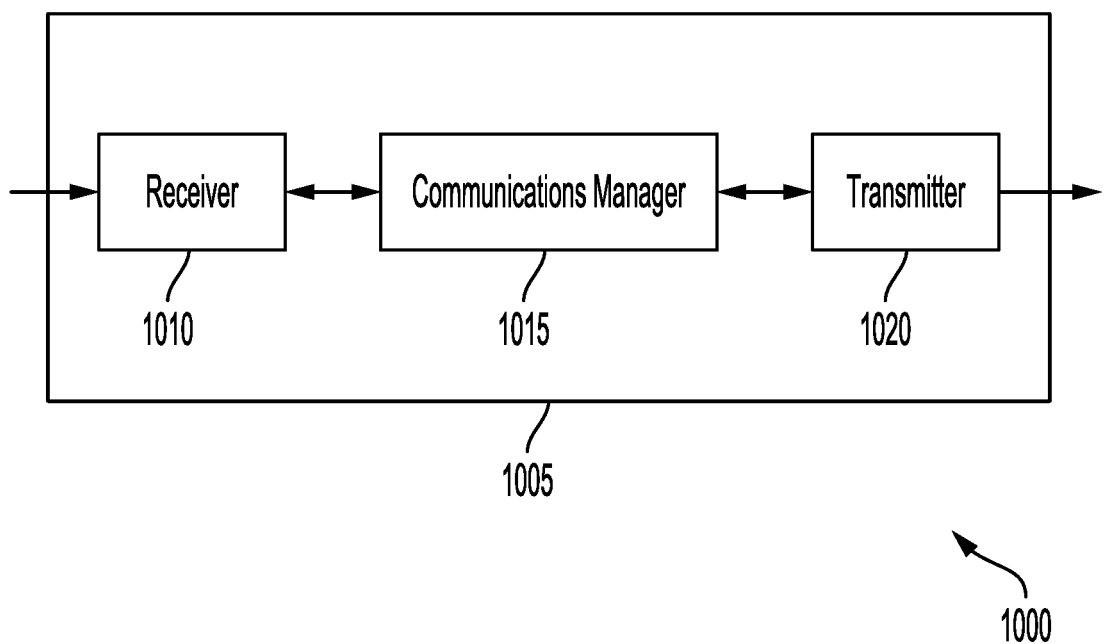
FIGS. 10 and 11 show block diagrams of devices that support regrouping of code blocks during retransmissions in accordance with aspects of the present disclosure.

FIG. 10 shows a block diagram 1000 of a device 1005 that supports regrouping of code blocks during retransmissions in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to regrouping of code blocks during retransmissions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a transmission comprising an indication of at least one failed code block group in a plurality of code block groups, wherein a code block group comprises a plurality of code blocks, re-assign code blocks to different code block groups according to a total number of code blocks across the at least one failed code block group and a maximum number of code block groups per transport block, and configure a retransmission based on the re-assigned code blocks. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
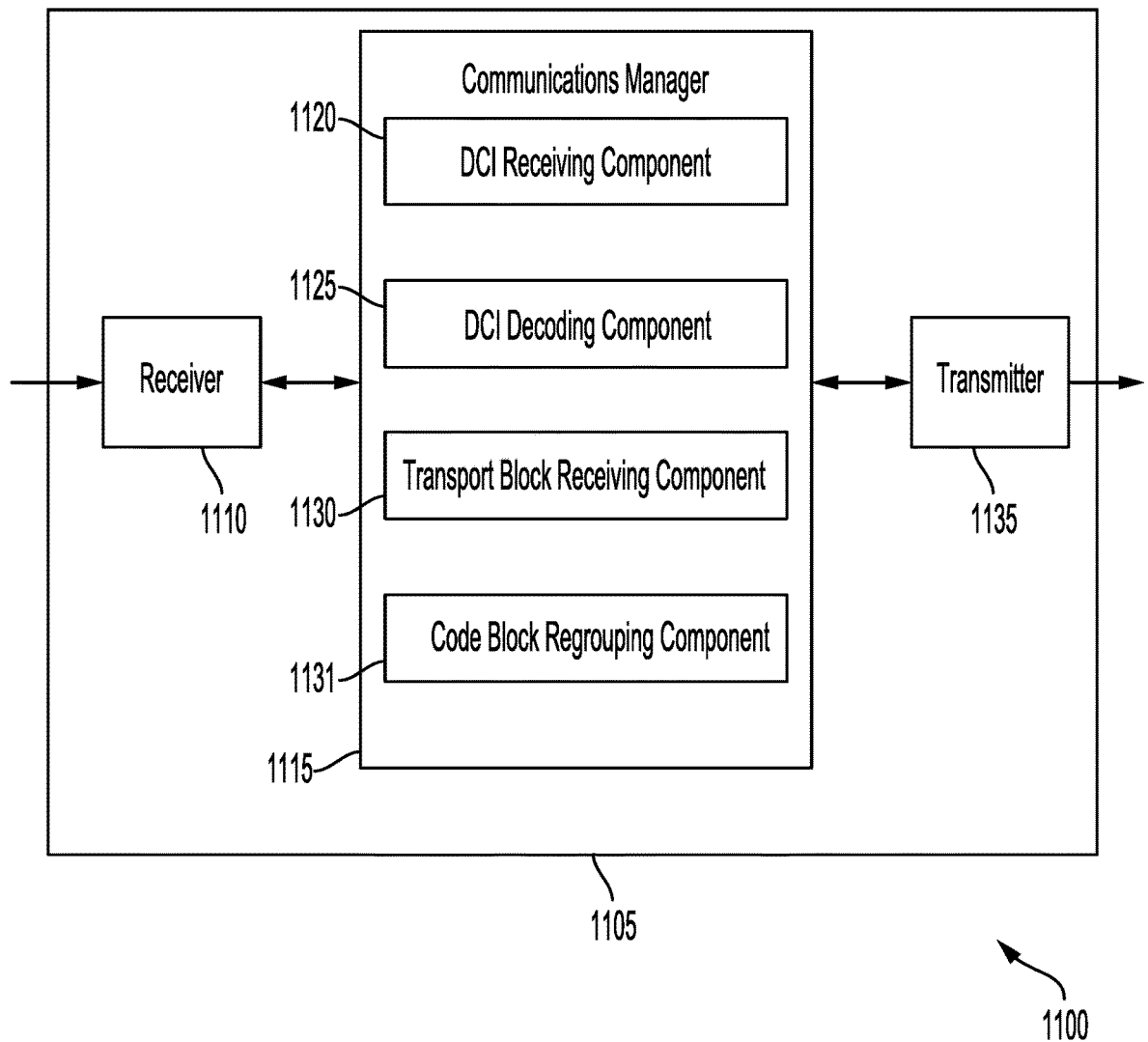

FIG. 11 shows a block diagram 1100 of a device 1105 that supports regrouping of code blocks during retransmissions in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to regrouping of code blocks during retransmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a DCI receiving component 1120, a DCI decoding component 1125, a transport block receiving component 1130, and a code block regrouping component 1131. The communications manager 1115 may be an example of aspects of the communications manager 1310 described herein.

The DCI receiving component 1120 may receive downlink control information including downlink control information for one or more transport blocks scheduled for the UE. The DCI decoding component 1125 may decode the downlink control information to obtain downlink control information for the one or more transport blocks. The transport block receiving component 1130 may receive the transport block from a base station based on the downlink control information. The code block regrouping component 1131 may regroup code blocks to code block groups for retransmission.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
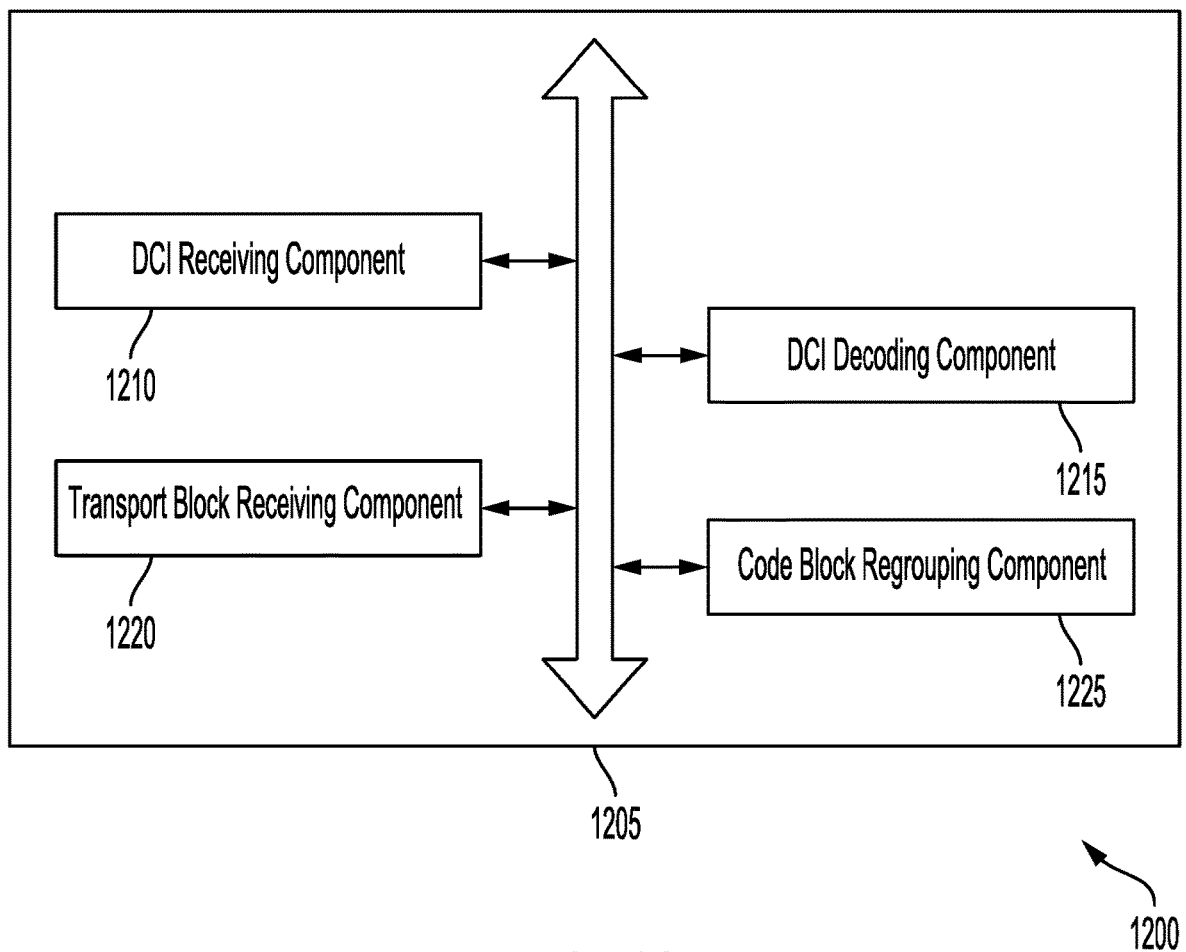
FIG. 12 shows a block diagram of a communications manager that supports regrouping of code blocks during retransmissions in accordance with aspects of the present disclosure.

FIG. 12 shows a block diagram 1200 of a communications manager 1205 that supports regrouping of code blocks during retransmissions in accordance with aspects of the present disclosure. The communications manager 1205 may be an example of aspects of a communications manager 1015, a communications manager 1115, or a communications manager 1310 described herein. The communications manager 1205 may include a DCI receiving component 1210, a DCI decoding component 1215, a transport block receiving component 1220, and a code block regrouping component 1225. Each of these modules may communicate, directly or indirectly, with one another (e.g., via one or more buses).

The DCI receiving component 1210 may receive downlink control information including downlink control information for a transport block scheduled for the UE.

The DCI decoding component 1215 may decode the downlink control information to obtain the downlink control information for one or more transport blocks.

The transport block receiving component 1220 may receive a transport block from a base station based on the downlink control information.

The code block regrouping component 1225 may regroup code blocks to code block groups for retransmission.

Figure 13:
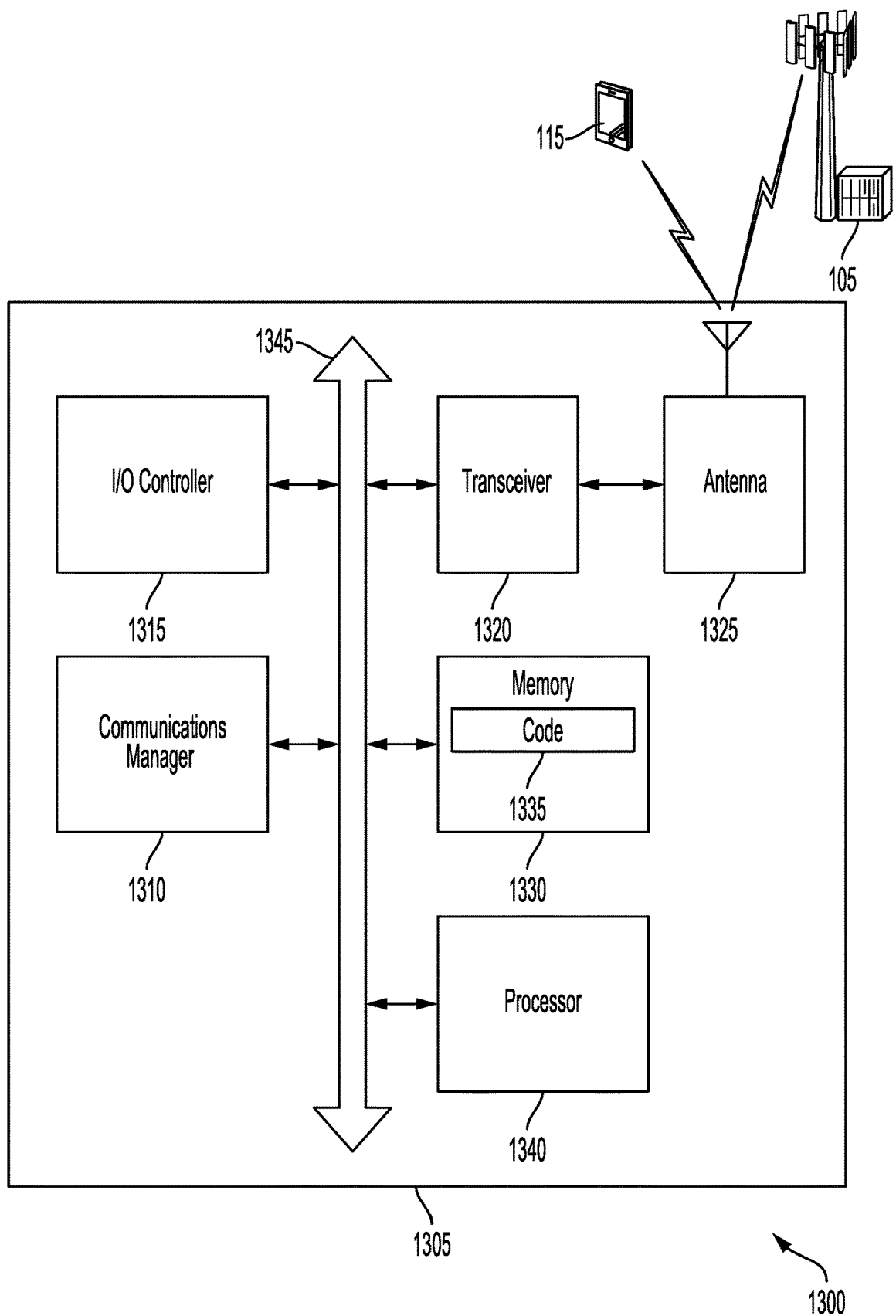
FIG. 13 shows a diagram of a system including a device that supports regrouping of code blocks during retransmissions in accordance with aspects of the present disclosure.

FIG. 13 shows a diagram of a system 1300 including a device 1305 that supports regrouping of code blocks during retransmissions in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive downlink control information including a transmission comprising an indication of at least one failed code block group in a plurality of code block groups, wherein a code block group comprises a plurality of code blocks, re-assign code blocks to different code block groups according to a total number of code blocks across the at least one failed code block group and a maximum number of code block groups per transport block, and configure a retransmission based on the re-assigned code blocks. The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting regrouping of code blocks during retransmissions).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
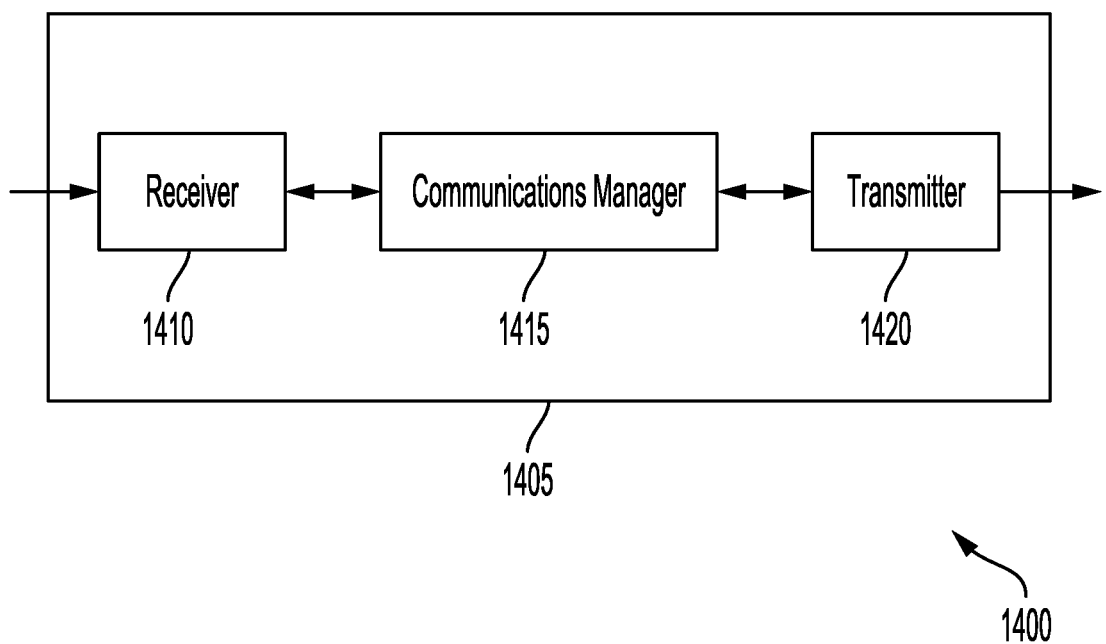
FIGS. 14 and 15 show block diagrams of devices that support regrouping of code blocks during retransmissions in accordance with aspects of the present disclosure.

FIG. 14 shows a block diagram 1400 of a device 1405 that supports regrouping of code blocks during retransmissions in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to regrouping of code blocks during retransmissions, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may receive a transmission comprising an indication of a failed decoding for at least one code block group of a plurality of code block groups, wherein a code block group comprises a plurality of code blocks, re-assign code blocks to different code block groups according to a total number of code blocks across the failed code block groups and a maximum number of code block groups per a transport block, and configure a retransmission based on the re-assigned code blocks. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17, The transmitter 1420 may utilize a single antenna or a set of antennas.

Figure 15:
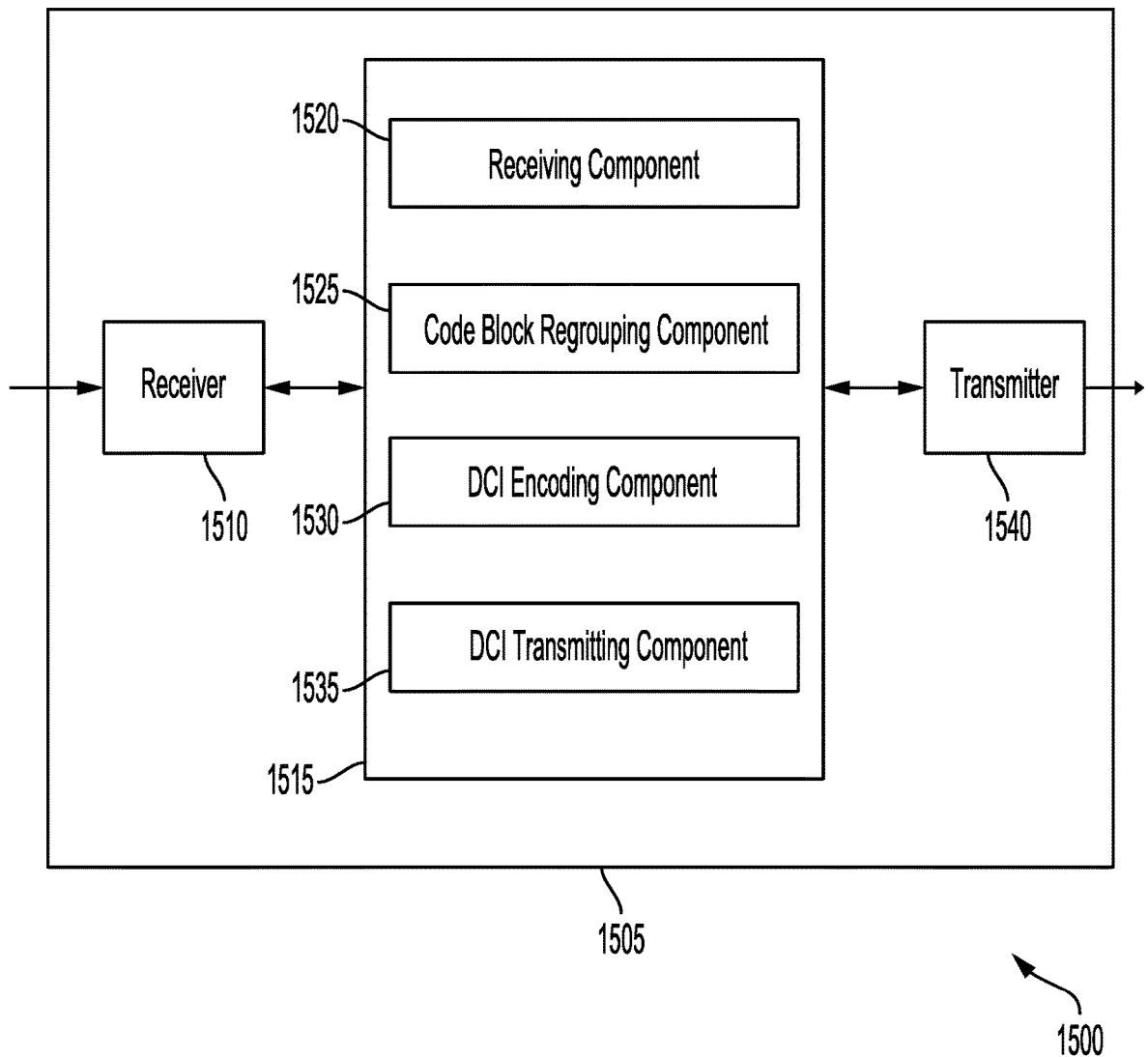

FIG. 15 shows a block diagram 1500 of a device 1505 that supports regrouping of code blocks during retransmissions in accordance with aspects of the present disclosure. The device 1505 may be an example of aspects of a device 1405, or a base station 105 as described herein. The device 1505 may include a receiver 1510, a communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to regrouping of code blocks during retransmissions, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a receiving component 1520, a code block regrouping component 1525, a DCI encoding component 1530, and a DCI transmitting component 1535. The communications manager 1515 may be an example of aspects of the communications manager 1710 described herein.

The receiving component 1520 may receive a transmission comprising an indication of a failed decoding for at least one code block group of a plurality of code block groups.

The code block regrouping component 1525 may regroup code blocks to different code block groups for retransmission.

The DCI encoding component 1530 may encode the downlink control information for one or more transport blocks.

The DCI transmitting component 1535 may transmit downlink control information.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
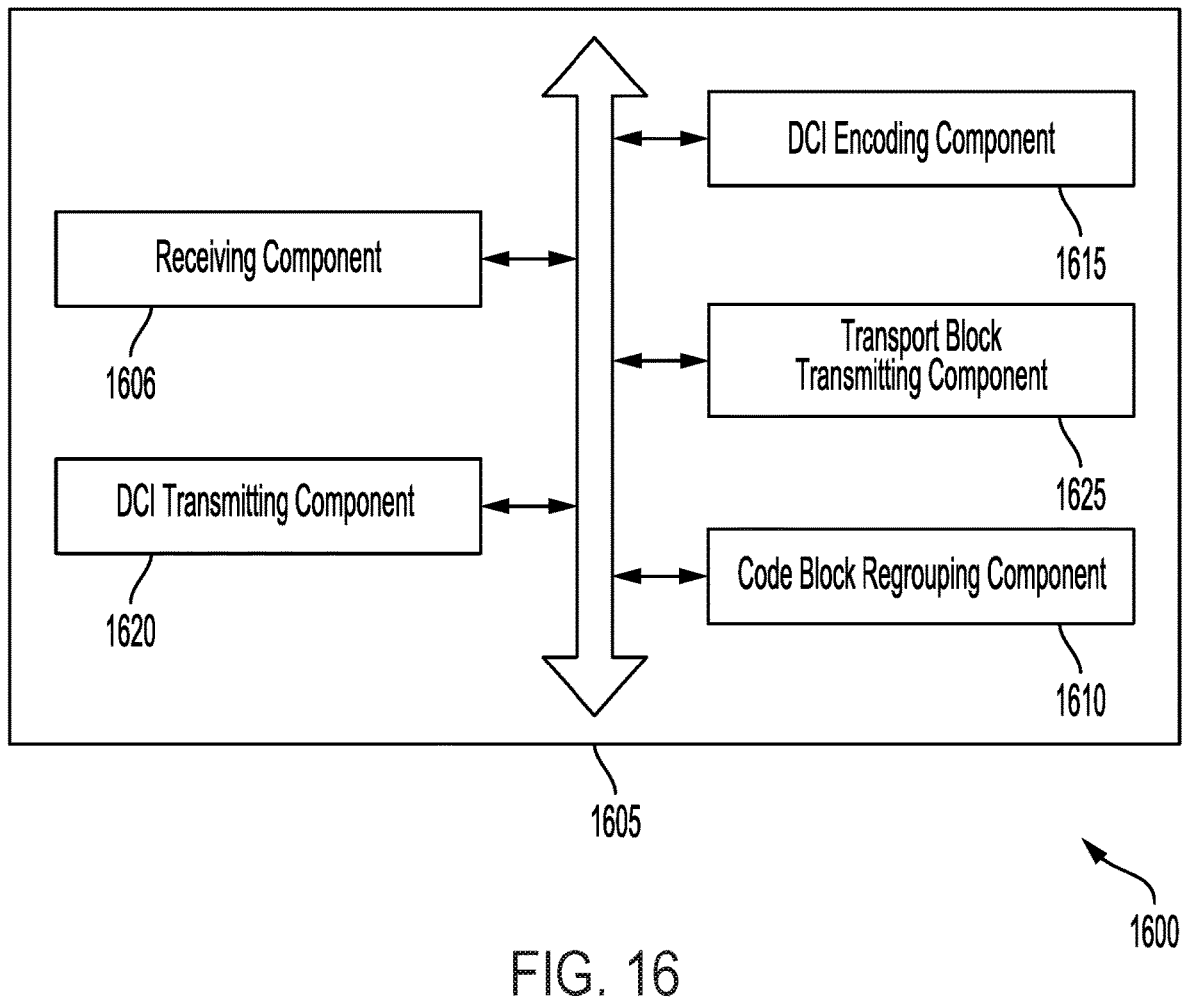
FIG. 16 shows a block diagram of a communications manager that supports regrouping of code blocks during retransmissions in accordance with aspects of the present disclosure.

FIG. 16 shows a block diagram 1600 of a communications manager 1605 that supports regrouping of code blocks during retransmissions in accordance with aspects of the present disclosure. The communications manager 1605 may be an example of aspects of a communications manager 1415, a communications manager 1515, or a communications manager 1710 described herein. The communications manager 1605 may include a receiving component 1606, a DCI encoding component 1615, a DCI transmitting component 1620, and a code block regrouping component 1610. Each of these modules may communicate, directly or indirectly, with one another (e.g., via one or more buses).

The receiving component 1606 may receive a transmission comprising an indication of a failed decoding for at least one code block group of a plurality of code block groups, wherein a code block group comprises a plurality of code blocks The DCI encoding component 1615 may encode the downlink control information for one or more transport blocks.

The code block regrouping component 1610 may re-assign code blocks to different code block groups according to a total number of code blocks across the failed code block groups and a maximum number of code block groups per a transport block, and configuring a retransmission based on the re-assigned code blocks.

A DCI transmitting component 1620 may transmit the downlink control information for a transport block to the UE. A transport block transmitting component 1625 may transmit the transport block to the UE based on the downlink control information.

Figure 17:
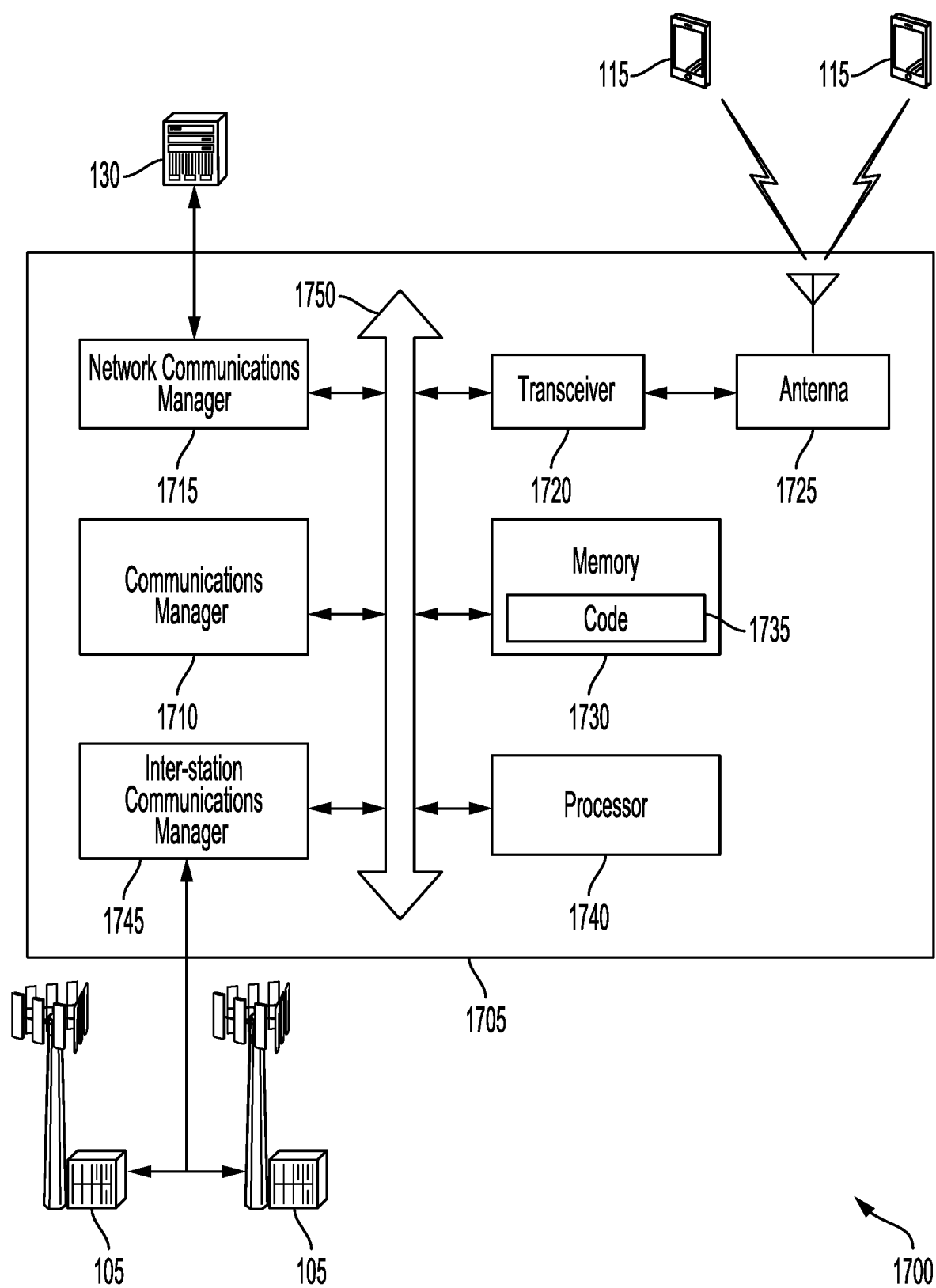
FIG. 17 shows a diagram of a system including a device that supports regrouping of code blocks during retransmissions in accordance with aspects of the present disclosure.

FIG. 17 shows a diagram of a system 1700 including a device 1705 that supports regrouping of code blocks during retransmissions in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may generate downlink control information to schedule a transport block for a UE, the downlink control information may be based on receiving a transmission comprising an indication of a failed decoding for at least one code block group of a plurality of code block groups, wherein a code block group comprises a plurality of code blocks, re-assigning code blocks to different code block groups according to a total number of code blocks across the failed code block groups and a maximum number of code block groups per a transport block, and configuring a retransmission based on the re-assigned code blocks.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting regrouping of code blocks during retransmissions).

The inter-station communications manager 1745 may manage communications with other base station 105 and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
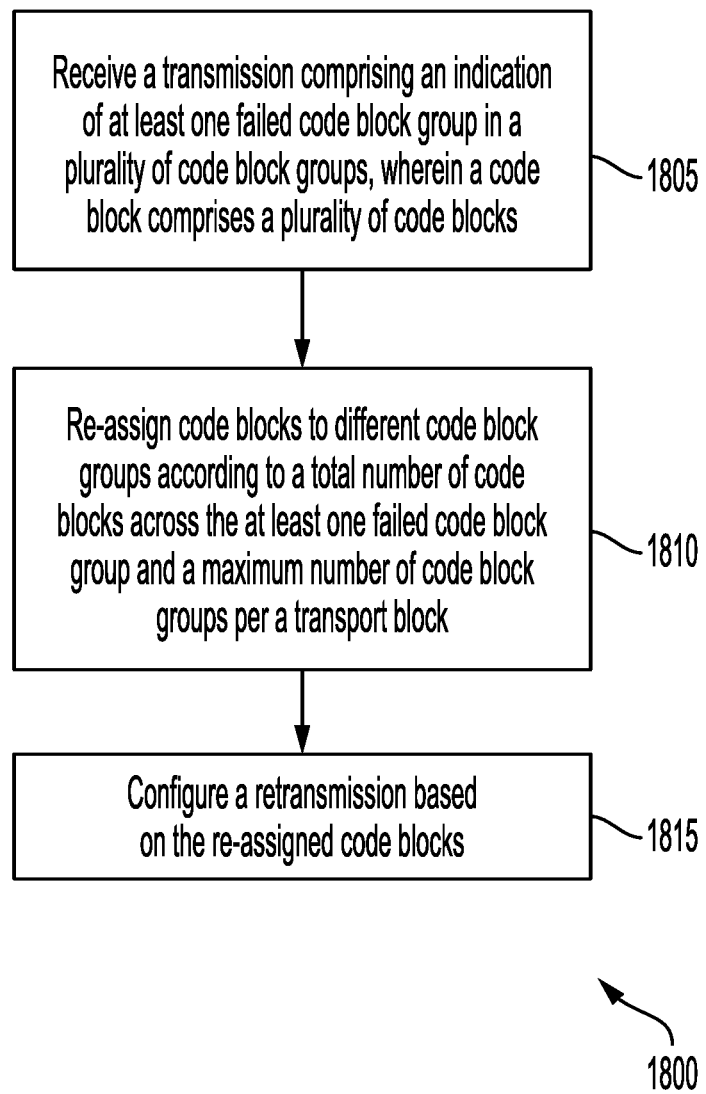
FIGS. 18 and 19 show flowcharts illustrating methods that support regrouping of code blocks during retransmissions in accordance with aspects of the present disclosure.

FIG. 18 shows a flowchart illustrating a method 1800 that supports regrouping of code blocks during retransmissions in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may receive a transmission comprising an indication of at least one failed code block group in a plurality of code block groups, wherein a code block group comprises a plurality of code blocks. In some examples, aspects of the operations of 1805 may be performed by a receiving component as described with reference to FIGS. 10 through 13.

At 1810, the UE may re-assign code blocks to different code block groups according to a total number of code blocks across the at least one failed code block group and a maximum number of code block groups per transport block. In some examples, aspects of the operations of 1810 may be performed by code block regrouping component as described with reference to FIGS. 10 through 13.

At 1815, the UE may configure a retransmission based on the re-assigned code blocks. The operations of 1815 may be performed according to the methods described herein. In some examples, aspects of the operations of 1815 may be performed by code block regrouping component as described with reference to FIGS. 10 through 13.

Figure 19:
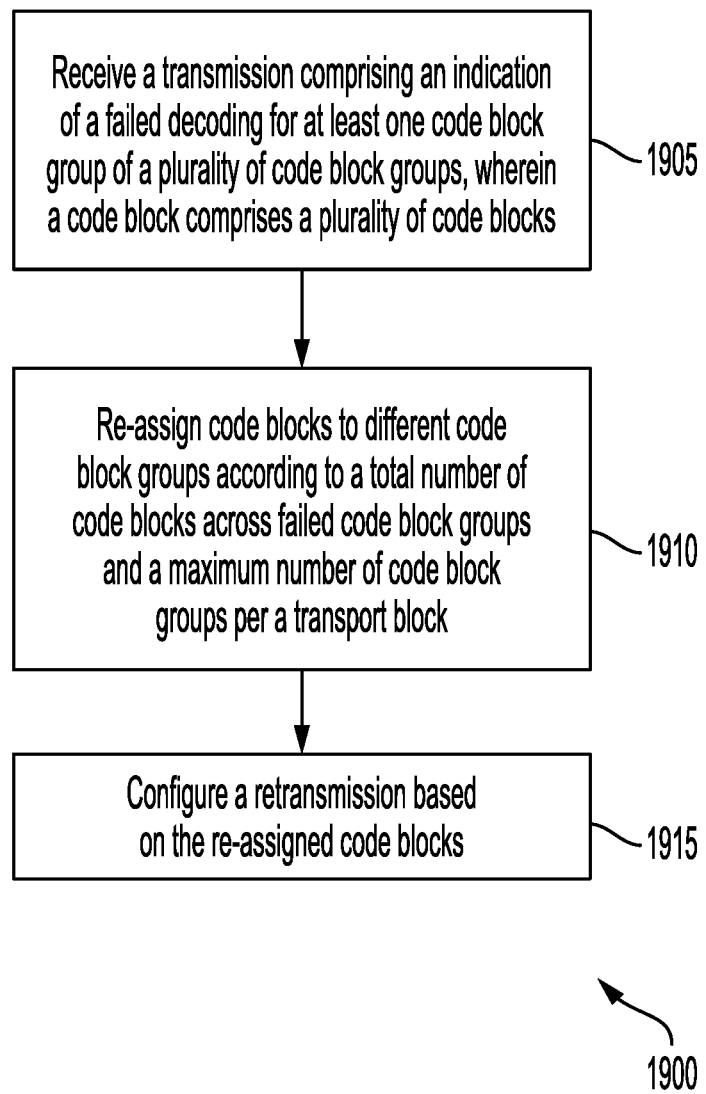

FIG. 19 shows a flowchart illustrating a method 1900 that supports regrouping of code blocks during retransmissions in accordance with aspects of the present disclosure. The operations of method 1900 may be implemented by a base station 105 or its components as described herein. For example, the operations of method 1900 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 1905, the base station may receive a transmission comprising an indication of a failed decoding for at least one code block group of a plurality of code block groups, wherein a code block group comprises a plurality of code blocks. The operations of 1905 may be performed according to the methods described herein. In some examples, aspects of the operations of 1905 may be performed by receiving component as described with reference to FIGS. 14 through 17.

At 1910, the base station may re-assign code blocks to different code block groups according to a total number of code blocks across the failed code block groups and a maximum number of code block groups per a transport block, and. The operations of 1910 may be performed according to the methods described herein. In some examples, aspects of the operations of 1910 may be performed by a code block regrouping component as described with reference to FIGS. 14 through 17.

At 1915, the base station may configure a retransmission based on the re-assigned code block. The operations of 1915 may be performed according to the methods described herein. In some examples, aspects of the operations of 1915 may be performed code block regrouping component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a transmission comprising an indication of a failed decoding for at least one code block group (CBG) of a plurality of CBGs, wherein a CBG comprises a plurality of code blocks (CBs); and
   generating a hybrid automatic repeat request (HARQ) feedback for at least one failed CB from the CBG, wherein the UE sends the HARQ feedback for the failed CB from the CBG when the CBG is scheduled based on a code block group transmission indicator (CBGTI) and does not send the HARQ feedback when the CBG is not scheduled based on the CBGTI.

2. The method of claim 1, further comprising generating the HARQ feedback for the plurality of CBGs.

3. The method of claim 2, wherein the generation of the HARQ feedback is enabled or disabled based on received radio resource control (RRC) signaling.

4. The method of claim 2, further comprising scheduling downlink control information (DCI) to dynamically enable or disable the HARQ feedback for the CBs.

5. The method of claim 4, wherein the size of the DCI is predetermined.

6. The method of claim 1, wherein the HARQ feedback is generated based on UE capability and is further controlled by radio resource control (RRC) signaling.

7. The method of claim 1, wherein the HARQ feedback comprises a negative acknowledgement (NACK), the NACK indicating a CBG comprises at least one CB for which decoding failed.

8. The method of claim 7, further comprising an acknowledgement (ACK) for CBG without a failed CB.

9. The method of claim 1, wherein the feedback is transmitted on physical uplink control channel (PUCCH) or multiplexed on physical uplink shared channel (PUSCH).

10. The method of claim 1, wherein the HARQ feedback is generated only for a CBG that comprises at least one CB for which decoding failed.

11. A method for wireless communication at a base station (BS), comprising:
    receiving a transmission comprising an indication of at least one failed code block group (CBG) in a plurality of CBGs, wherein a CBG comprises a plurality of code blocks (CBs); and generating a code block group transmission indicator (CBGTI) for at least one failed CB from the CBG, wherein the BS receives a hybrid automatic repeat request (HARQ) feedback during a retransmission of the failed CB when the CBG is scheduled based on the CBGTI and does not receive the HARQ feedback when the CBG is not scheduled based on the CBGTI.

12. The method of claim 11, wherein subsequent retransmissions comprise fewer code blocks than previous transmissions.

13. The method of claim 11, wherein the additional CBGTI comprises a negative acknowledgement (NACK), the NACK indicating a CBG comprises at least one CB for which decoding failed.

14. The method of claim 11, further comprising an acknowledgement (ACK) for a CBG without a failed CB.

15. The method of claim 11, wherein the additional CBGTI is generated only for a CBG that comprises at least one CB for which decoding failed.

16. The method of claim 12, wherein subsequent retransmissions comprise only failed CBs from previous transmissions or retransmissions.

17. A user equipment (UE), comprising:
a memory; and
a processor coupled to the memory, the processor being configured to:
receive a transmission comprising an indication of a failed decoding for at least one code block group (CBG) of a plurality of CBGs, wherein a CBG comprises a plurality of code blocks (CBs); and
generate a hybrid automatic repeat request (HARQ) feedback for at least one failed CB from the CBG, wherein the processor sends the HARQ feedback for the failed CB from the CBG when the CBG is scheduled based on a code block group transmission indicator (CBGTI) and does not send the HARQ feedback when the CBG is not scheduled based on the CBGTI.

18. The UE of claim 17, wherein the processor is further configured to generate the HARQ feedback for the plurality of CBs.

19. The UE of claim 18, wherein the processor is further configured to enable or disable the HARQ feedback of codeblocks based on received radio resource control (RRC) signaling.

20. The UE of claim 18, wherein the processor is further configured to schedule downlink control information (DCI) to dynamically enable or disable the HARQ feedback for at least one failed CB from the CBGs.

21. A base station (BS), comprising:
a memory; and
a processor coupled to the memory, the processor being configured to:
receive a transmission comprising an indication of at least one failed code block group (CBG) in a plurality of CBGs, wherein a CBG comprises a plurality of code blocks (CBs); and
generate a code block group transmission indicator (CBGTI) for at least one failed CB from the CBG, wherein the processor receives a hybrid automatic repeat request (HARQ) feedback during a retransmission of the failed CB when the CBG is scheduled based on the CBGTI and does not receive the HARQ feedback when the CBG is not scheduled based on the CBGTI.

22. The BS of claim 21, wherein the processor is further configured to receive subsequent retransmissions comprising fewer CBs than previous transmissions.

23. A base station (BS), comprising:
means for receiving a transmission comprising an indication of a failed decoding for at least one code block group (CBG) of a plurality of CBGs, wherein a code block group comprises a plurality of code blocks (CBs); and
means for generating a code block group transmission indicator (CBGTI) for at least one failed CB from the CBG, wherein the BS receives a hybrid automatic repeat request (HARQ) feedback during a retransmission of the failed CB when the CBG is scheduled based on the CBGTI and does not receive the HARQ feedback when the CBG is not scheduled based on the CBGTI.

24. A user equipment (UE), comprising:
means for receiving a transmission comprising an indication of at least one failed code block group (CBG) in a plurality of CBGs, wherein a CBG comprises a plurality of code blocks (CBs); and
means for generating a hybrid automatic repeat request (HARQ) feedback for at least one failed CB from the CBG, wherein the user equipment sends the HARQ feedback for the failed CB from the CBG when the CBG is scheduled based on a code block group transmission indicator (CBGTI) and does not send the HARQ feedback when the CBG is not scheduled based on the CBGTI.

* * * * *